United States Patent
Xu et al.

(10) Patent No.: US 7,630,981 B2
(45) Date of Patent: Dec. 8, 2009

(54) METHOD AND SYSTEM FOR LEARNING ONTOLOGICAL RELATIONS FROM DOCUMENTS

(75) Inventors: Kui Xu, Shanghai (CN); Fuliang Weng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 11/645,386

(22) Filed: Dec. 26, 2006

(65) Prior Publication Data

US 2008/0154578 A1    Jun. 26, 2008

(51) Int. Cl.
G06F 17/30    (2006.01)

(52) U.S. Cl. .................................. 707/6; 707/3; 707/101

(58) Field of Classification Search .................... 707/3, 707/6, 101
See application file for complete search history.

(56) References Cited

U.S. PATENT DOCUMENTS

| | | | | |
|---|---|---|---|---|
| 5,953,718 A * | 9/1999 | Wical | ............................ | 707/5 |
| 6,370,542 B1 * | 4/2002 | Kenyon | ................. | 707/103 R |
| 6,629,095 B1 * | 9/2003 | Wagstaff et al. | ............... | 707/5 |
| 6,665,668 B1 * | 12/2003 | Sugaya et al. | ................... | 707/6 |
| 6,721,728 B2 * | 4/2004 | McGreevy | ..................... | 707/3 |
| 6,741,744 B1 * | 5/2004 | Hsu | ........................... | 382/229 |
| 6,741,981 B2 * | 5/2004 | McGreevy | ..................... | 707/3 |
| 6,772,160 B2 * | 8/2004 | Cho et al. | ..................... | 707/10 |
| 6,823,333 B2 * | 11/2004 | McGreevy | ..................... | 707/4 |
| 7,089,298 B2 * | 8/2006 | Nyman et al. | ............... | 709/220 |
| 7,383,169 B1 * | 6/2008 | Vanderwende et al. | ......... | 704/9 |
| 7,436,887 B2 * | 10/2008 | Yeredor et al. | ......... | 375/240.01 |
| 2004/0172393 A1 * | 9/2004 | Kazi et al. | ..................... | 707/6 |
| 2005/0096897 A1 * | 5/2005 | Ando et al. | .................... | 704/4 |
| 2005/0278325 A1 * | 12/2005 | Mihalcea et al. | ............... | 707/6 |
| 2006/0161544 A1 * | 7/2006 | Lee et al. | ....................... | 707/6 |
| 2006/0178862 A1 * | 8/2006 | Chan et al. | .................... | 703/11 |

* cited by examiner

*Primary Examiner*—Don Wong
*Assistant Examiner*—Kim T Nguyen
(74) *Attorney, Agent, or Firm*—Courtney Staniford & Gregory LLP

(57) ABSTRACT

Embodiments of an ontological determination method for use in natural language processing applications are described. In one embodiment, shallow lexico-syntactic patterns are applied to identify relations by extracting term features to distinguish relation terms from non-relation terms, identifying coordinate relations for every adjacent terms; identifying short-distance ontological (e.g., hypernym or part-whole relations) for other adjacent terms based on term features and lexico-syntactic patterns; and then inferring long-distance hypernym and part-whole relations based on the identified coordinate relations and the short-distance relations.

13 Claims, 5 Drawing Sheets

US 7,630,981 B2

METHOD AND SYSTEM FOR LEARNING ONTOLOGICAL RELATIONS FROM DOCUMENTS

FIELD

Embodiments of the invention relate generally to natural language processing, and more specifically to learning ontological relations from documents.

BACKGROUND

Natural language processing (NLP) systems attempt to reproduce human interpretation of language. NLP methods assume that the patterns in grammar and the conceptual relationships between words can be articulated scientifically. NLP systems require the determination of ontological relations among words or terms in a document. With respect to NLP systems, ontology refers to the explicit specification of the representation of objects in a phrase, and the relationships between them. In general, ontological relations comprise such relations as hypernym and meronym relations between two terms. Ontological relations are very important for natural language processing (NLP) applications such as question answering, information retrieval, dialogue systems, semantic inference, machine translation and other similar applications.

Traditionally, prior art methods to obtain lexico-syntactic patterns in spoken utterances apply open-domain syntactic analysis techniques. This method, however, does not work for manual data, such as documents or written text data with specific types of data content that have set relationships. Prior studies have pointed out that a set of lexico-syntactic patterns indicate hypernym relations between noun phrases (NP). Examples of such patterns are: "such NP as {NP,}* {(or|and)} NP" and "NP {,} including {NP,}* {(or|and)} NP". Such an approach may be able to successfully extract hypernym relations, but it generally cannot extract part-whole relations because of the ambiguous meronymic context (e.g. cat's paw and cat's dinner).

Other methods have used hypernym relations as semantic constrains to extract part-whole relations. Such techniques have generally achieved some level of success with respect to precision and recall, but only for the following three types of patterns: "Y verb X," "Y's X" and "X of Y," where X and Y are nouns. Another prior art method has combined coordinate term identification and dependency path methods to automatically find hypernym relations in large documents, such as a large news corpus. A sample dependency path, "N:PCOMP-N:PREP, such as, PREP:MOD:N" in this technique is equivalent to the pattern "$NP_Y$ such as $NP_X$" in other methods. These dependency paths resemble lexico-syntactic patterns but cover long-distance dependencies.

These present prior art ideas share the same limitation of only using complete lexico-syntactic patterns. They do not use partial or generalized patterns, as well as complete patterns. Furthermore, these prior art technologies are generally used in data sources such as news and encyclopedia sources where there is no known set of terms. They do not generally make use of the terms available in certain documents, such as manuals.

In general, present ontological determination systems do not attempt to identify both hypernym and part-whole relations from documents or any type of manual text. In addition, toolkits (e.g., part-of-speech taggers and parsers) and resources used in these systems are not targeted at manual data.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of an ontological determination method for use in natural language systems are described. These methods learn ontological relations (e.g., hypernym and part-whole relations) from manual data using lexico-syntactic patterns. In one embodiment, shallow lexico-syntactic patterns are applied to identify relations by extracting term features to distinguish relation terms from non-relation terms, identifying coordinate relations for every adjacent terms; identifying short-distance ontological (e.g., hypernym or part-whole relations) for other adjacent terms based on term features and lexico-syntactic patterns; and then inferring long-distance hypernym and part-whole relations based on the identified coordinate relations and the short-distance relations.

In an embodiment, ontological relations in a noun-phrase utterance are extracted by using the term features and shallow/generalized lexico-syntactic patterns. The particular application involving those features and patterns is the identification of coordinate relations and hypernym/part-whole relations. Domain-specific hypernym and part-whole relations are essential in building domain ontologies. Accurately identifying hypernym and part-whole relations is a time consuming task. Embodiments can be used to automatically identify domain-specific hypernym and part-whole relations.

In the following description, numerous specific details are introduced to provide a thorough understanding of, and enabling description for, embodiments of the ontological relation determination method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
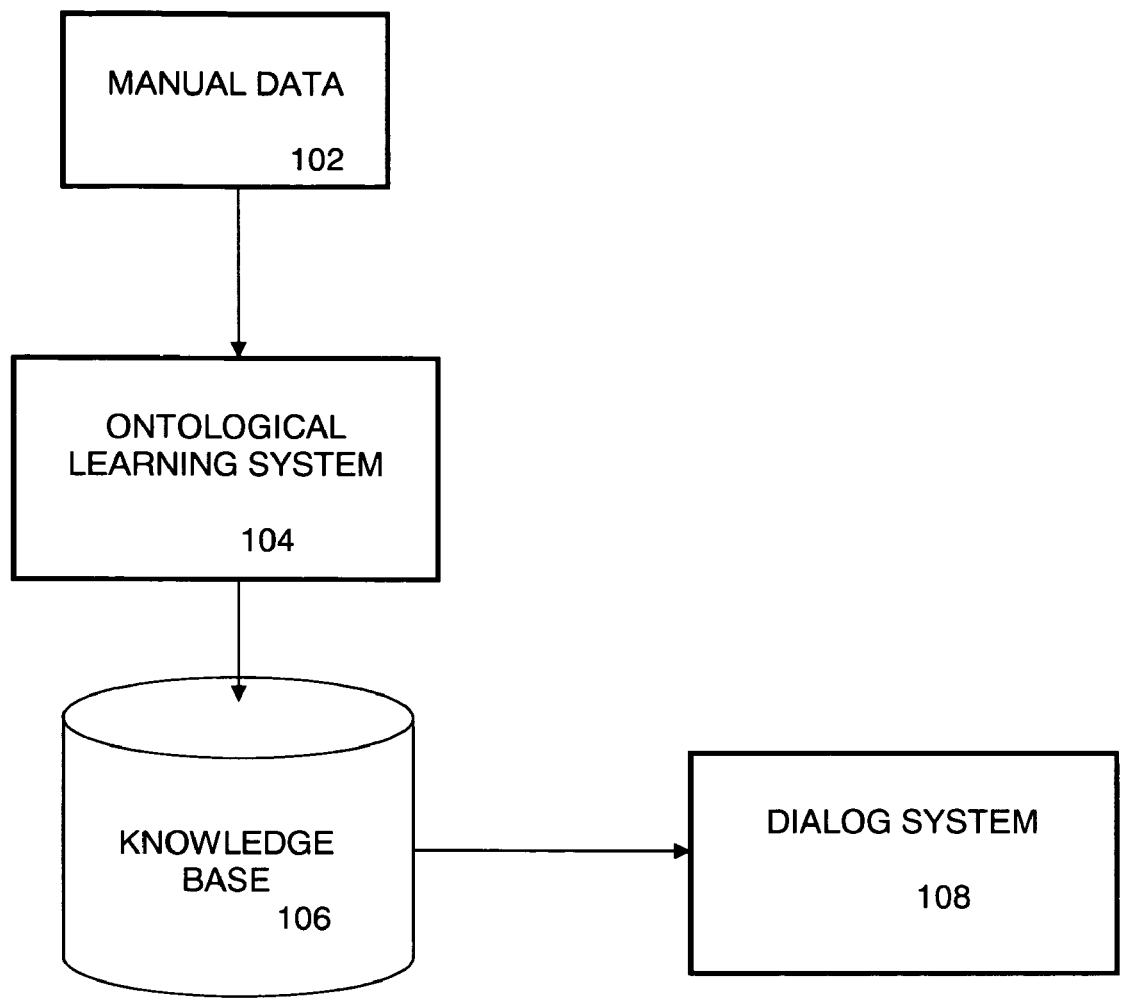
FIG. 1 is a block diagram of a natural language processing system including an ontological learning component, according to an embodiment.

FIG. 1 is a block diagram of a natural language processing system that includes an ontological leaning component, according to an embodiment. System 100 illustrated in FIG. 1 acts on manual data 102 to provide an improved knowledge base 106 to a dialog system 108 through the use of ontological learning system 104. Manual data 102 generally represents a written body of text or alphanumeric data, which describes specific characteristics about a particular topic or topics. Such manual data may be exemplified by user manuals, organizational charts, catalogs, operational instructions, field manuals, scientific papers, or any other similar document. Such documents are characterized by the fact that they typically involve descriptions of data or certain content items, and are indexed or otherwise cataloged. Moreover, certain attributes regarding the content data are defined and known in relation to other content within the document. The relationships among the data items are determined by the ontological learning system 104 to inform the knowledge base 106, which provides terms to the dialog system 108.

The dialog system 108 that makes use of the knowledge base 106 generated by the ontological learning component 104 can be any type of dialog system or similar application, such as a reasoning system, a question and answer system, machine translation, or similar system.

System 100 can be implemented in a distributed computing system comprising a number of computers or workstations coupled together over a network. Alternatively, the functional blocks of system 100 can be implemented in a single computer that represents a unitary dialog system, or in any type of device, such as appliances, machinery, and other type of computer-controlled or automated apparatus.

Embodiments of the natural language processing system 100, utilize Conditional Maximum Entropy (CME) modeling, which provides the ability to incorporate a variety of features in a uniform framework. The main tasks in CME modeling include feature generation, feature selection, which chooses from a feature space a subset of good features to be included in the model, and a parameter estimation process that estimates the weighting factors for each selected feature in the exponential model. Besides maximum entropy techniques, other types of statistical classification techniques can also be used.

The natural language processing system 100 takes as input the manual data (e.g., text) 102 and identifies certain terms within the text through dialog system 108. In one embodiment, the ontological determination component 104 assumes that candidate terms for recognition by the dialog system are noun phrases in the manual text 102. The base noun phrases (NP) are all generally simple and non-recursive noun phrases. Each NP can comprise domain terms and domain-related terms. A domain term is a concrete concept that represents an object, like a special device (e.g., a Sharp™ PDA), a device item (e.g. button, cable, etc.), or an item related to an aspect of a device (e.g., a device interface item, like a menu, etc.), and can contain multiple words. A domain-related term is a concrete concept that represents a general device (e.g. computer), that is not a specific domain-specific item (e.g., a particular computing device). A domain-related term can also contain multiple words.

The ontological learning component 104 in FIG. 1 uses the term features and lexico-syntactic patterns to identify ontological relations among the candidate terms. A term feature could be a special word in the domain or domain-related term, and may be characterized by containing capital words or marking the beginning of a sentence. An ontological relation includes such relations as hypernym and part-whole relations between two terms X and Y A term X is a hypernym (or superordinate) of another term Y if its meaning includes the meaning of Y In other words, a term X is a hypernym of Y if a user accepts that "Y is X" or "Y is a type of X". Hypernyms are the opposite of hyponyms in which, for the above examples, Y would be a hyponym of X. Thus, as an example, if PDAs (Personal Digital Assistant), notebook computers, and workstations are all types of computing devices, PDA is a hyponym of computing device, and computing device is a hypernym of PDA. A term X is a holonym of a term Y if a user accepts that "Y is part of X", "Y is member of X" or "Y is a staff of X". Holonyms are the opposite of meronyms in which, for the above examples, Y would be a meronym of X.

Term features could be a word or a word sequence or pattern in a domain. Term features are usually two set of words in which one set of words occurs more often in relation terms and seldom in non-relation terms, while the other set of words occurs more often in non-relation terms and seldom in relation terms. Relation terms are those terms involved in at least one relation. Non-relation terms are those terms that have never been involved in any relation. A lexico-syntactic pattern consists of term features of two target terms and word strings between the two target terms. A generalized pattern is the maximum common sub-string from a set of patterns with the same verb.

The ontological relations between terms could also comprise other types of relations, such as synonym, which is a word with the same meaning as another word (e.g. "shut" is a synonym of "closed"); antonym, which is a word that means the opposite of another word (e.g. "wet" is a antonym of "dry"); coordinate terms, which are nouns or verbs that have the same hypernym; entailment terms, in which a verb X entails Y if X cannot be done unless Y is, or has been, done (e.g., "cure" entails "treat"); troponym, which is a verb expressing a specific manner of doing something (e.g., "march" is a troponym of "walk"); and causal relations in which one thing causes another thing to happen or exist (e.g., "displace" cause "move"). Besides these examples, other ontological relations known in the art, or developed for specific applications, could also be used.

Figure 2:
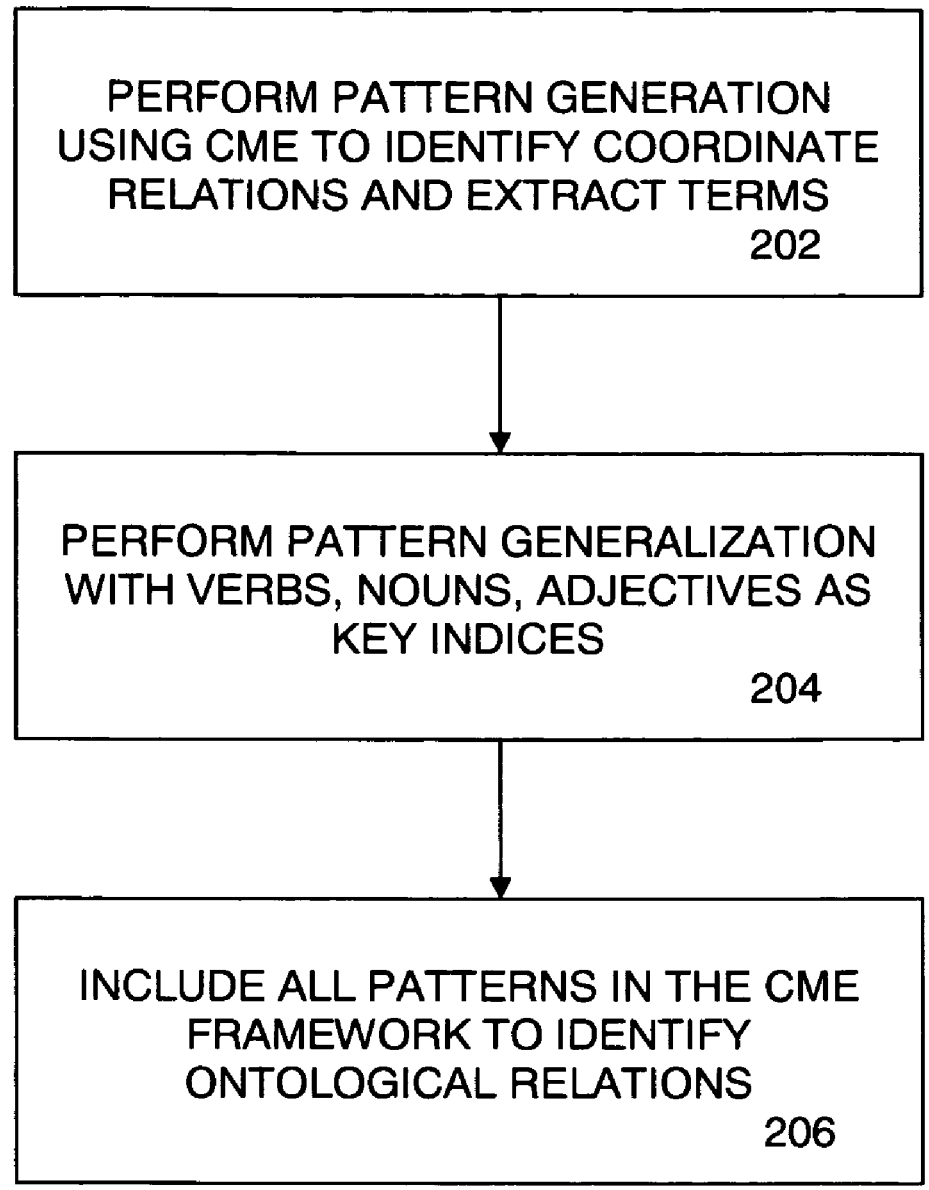
FIG. 2 is a flow diagram that illustrates the main functional tasks of the ontological learning system, according to an embodiment.

FIG. 2 is a flow diagram that illustrates the main functional tasks of the ontological learning system, according to an embodiment. In block 202, the ontological learning component performs a pattern generation process using CME or similar method to identify coordinate relations and extract terms. A pattern is a string that represents the word sequence from term X to term Y, and also includes the term feature of X and Y. The term included in between X and Y is rewritten as a noun phrase. In block 204, the process performs pattern generalization. Patterns (i.e., strings that contain the same verbs) may share a common sub-string that represents the word sequence shared among these patterns. The pattern generalization step finds the common sub-string. In one embodiment, verbs are used as the key index. Alternatively, adjectives, nouns and their combinations with prepositions can also be used. In block 206, all patterns in the CME framework are included to identify ontological relations.

Figure 3:
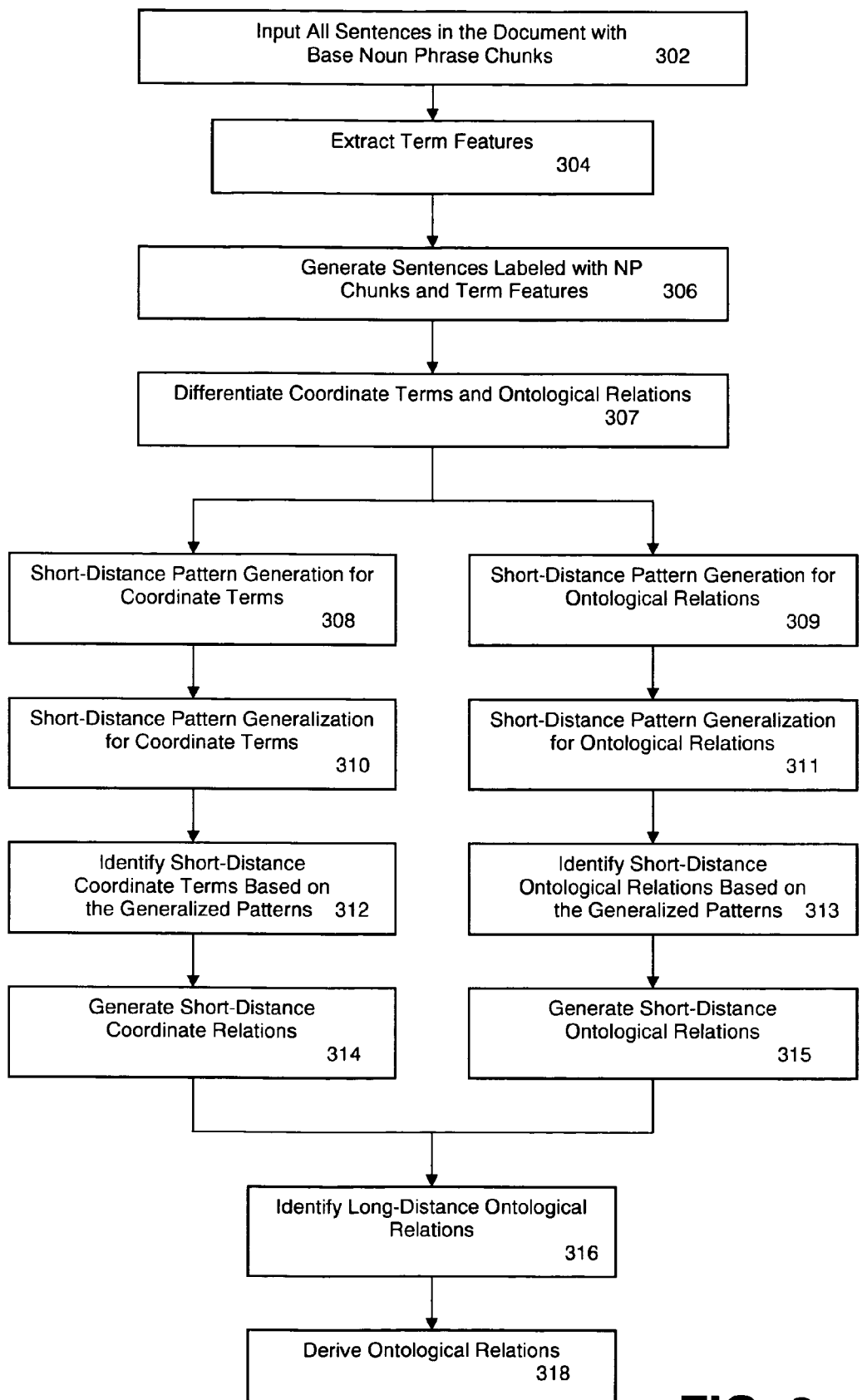
FIG. 3 is a flowchart that illustrates the steps of learning ontological relations for noun-phrases in a document, under an embodiment.

FIG. 3 is a flowchart that illustrates the steps of learning ontological relations for noun-phrases in a document, under an embodiment. In general, the method of FIG. 3 uses the term features and shallow/generalized lexico-syntactic patterns to identify ontological relations between the noun phrases in the document. Features and patterns are used in the CME framework to identify coordinate relations and short-distance hypernym/part-whole relations. Then, long-distance hypernym/part-whole relations are inferred based on coordinate relations and short-distance hypernym/part-whole relations. A short distance exists when, for a relation between any two terms X and Y, there is no more than one term included between X and Y. Alternatively, a short distance could be defined as a condition in which up to two terms are included between X and Y. A long distance exists when, for a relation between any two terms X and Y, there are two or more terms included between X and Y. Thus, if a sentence comprises the coordinate terms A, B, C, and D, the pairs A, B, and A, C are short distance in systems that allow for both bi-gram and tri-gram models. Longer distances are defined as greater than trigram, such as A, D.

Two terms that share the same hypernym/holonym parent semantically are coordinate terms. Syntactically, for a pattern such as "A includes X and Y", X and Y are coordinate terms.

In block 302, the ontological learning process receives all sentences in the input document with base NP chunks. The term features in the noun phrases are then extracted to distinguish the domain terms, block 304. The term features are used distinguish domain and non-domain related terms. In block 306, the process generates sentences labeled with NP chunks and term features. The ontological learning process proceeds in two parallel paths, one for coordinate terms, and the other for ontological relations. Thus, in block 307, the process differentiates the processing path for these two types of characteristics. Each processing path then operates on short-distant patterns to increase reliability. In general, it is not possible or highly impractical to enumerate all possible patterns. Thus, the process splits the patterns into smaller units that are short-distance patterns. Such patterns represent a kind of "back-off" condition.

In block 308, the short-distance pattern is generated for coordinate terms. This comprises essentially the pure extraction of certain patterns. The short-distance patterns are then generalized for the coordinate terms, block 310. Certain patterns may share a certain element (e.g., verb) in common. The generalization step identifies the patterns that share common elements and hooks onto these common patterns and ignores the patterns that are different. This results in short-distance pattern generalization. In block 312, the short-distance coordinate terms are identified based on the original and generalized patterns. In one embodiment, a Maximum Entropy classification is used to determine whether two terms are coordinate or not in a binary decision. The short-distance coordinate relations are then generated, block 314. This processing path finds the commonalities that provide some measure of back-off if an exact match of the two patterns does not occur, thus allowing the identification of one pattern as a more general version of the other. The use of statistical modeling eliminates the need to exactly match every pattern, but instead allows a weighting formula to be used to obtain a relatively accurate indication of pattern relationships.

An analogous path is performed for the ontological relations. Thus, in block 309, the short-distance pattern is generated for the ontological relations. The short-distance patterns are then generalized for the ontological relations, block 311. In block 313, the short-distance ontological relations are identified based on the original and generalized patterns. The short-distance ontological relations are then generated, block 315. These short-distance coordinate term and ontological relation processing streams could be executed in parallel or sequentially depending upon the processing implementation.

The short-distance coordinate terms generated in processing blocks 308, 310, 312 and 314, and the short-distance ontological relation generated in processing blocks 309, 311, 313, and 315 are used together to identify the long-distance ontological relations, as shown in block 316. The ontological relations are then derived, as shown in block 318.

Figure 4:
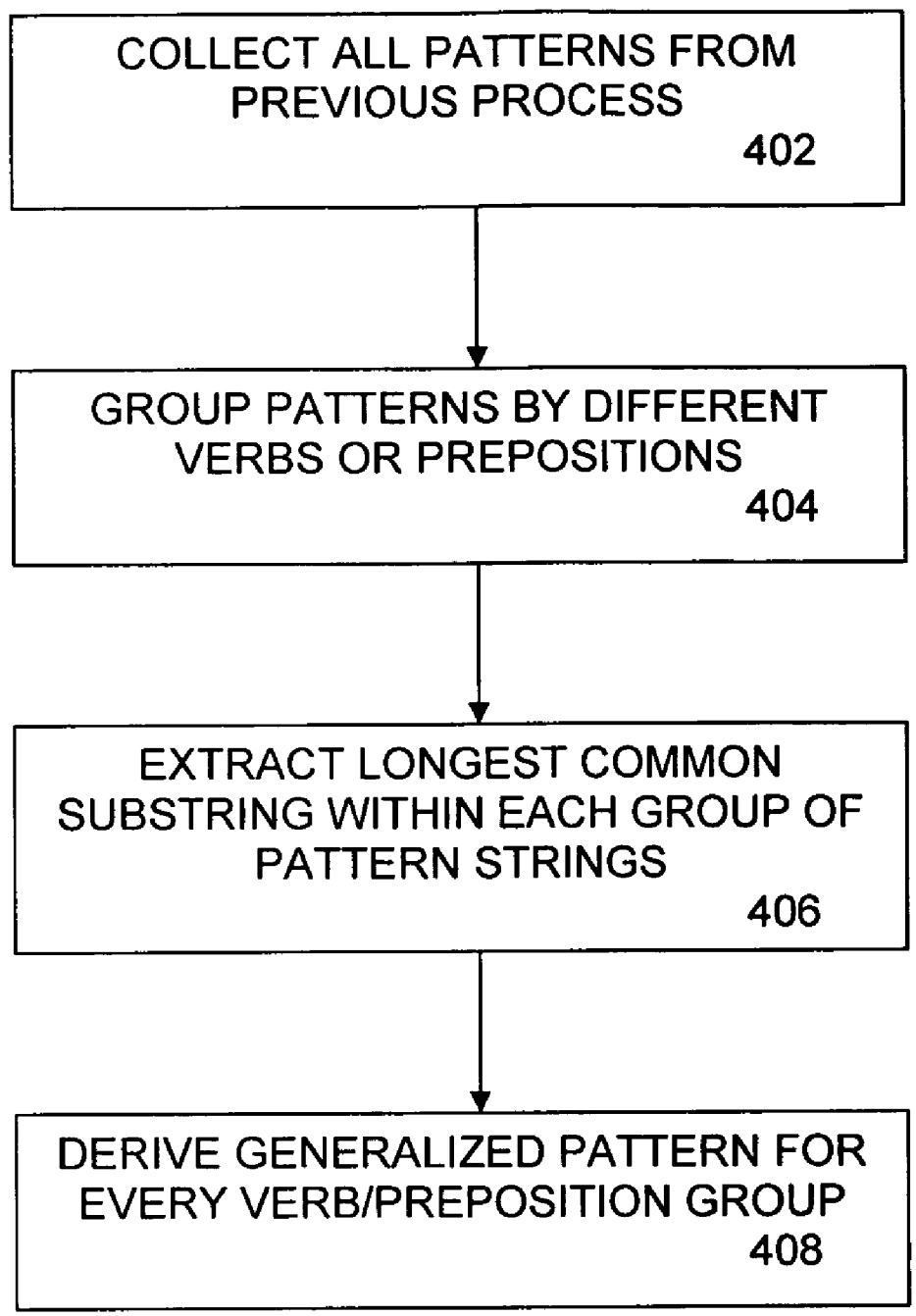
FIG. 4 is a flowchart that illustrates a method of generalizing patterns in an ontological learning process, under an embodiment.

As shown in FIG. 3, the short-distance patterns for both the coordinate terms and ontological relations are generalized in steps 310 and 311, respectively. FIG. 4 is a flowchart that illustrates a method of generalizing patterns in an ontological learning process, under an embodiment. As shown in FIG. 4, in block 402 the process inputs all the short-distance patterns generated in steps 308 or 310 of FIG. 3. The patterns are then grouped by verbs or prepositions, block 404. The longest common substring within each group of pattern strings is then extracted, block 406. In block 408, the generalized pattern for every verb group is derived.

For example, there may be three patterns that contain the verb "include" in the input pattern list, i.e., "X includes Y", "X includes not only Y," and "X includes NP, Y." The "NP" in the last pattern could be "sharp components" in a specific case. After generalization, the longest common pattern string (except X and Y in the string) is "include". Therefore, the output pattern of the "include" group is "X includes * Y", where "*" is a wild character. This represents the generalized pattern. In the above cases, the wildcard corresponds to null, "not only," and the NP.

Figure 5:
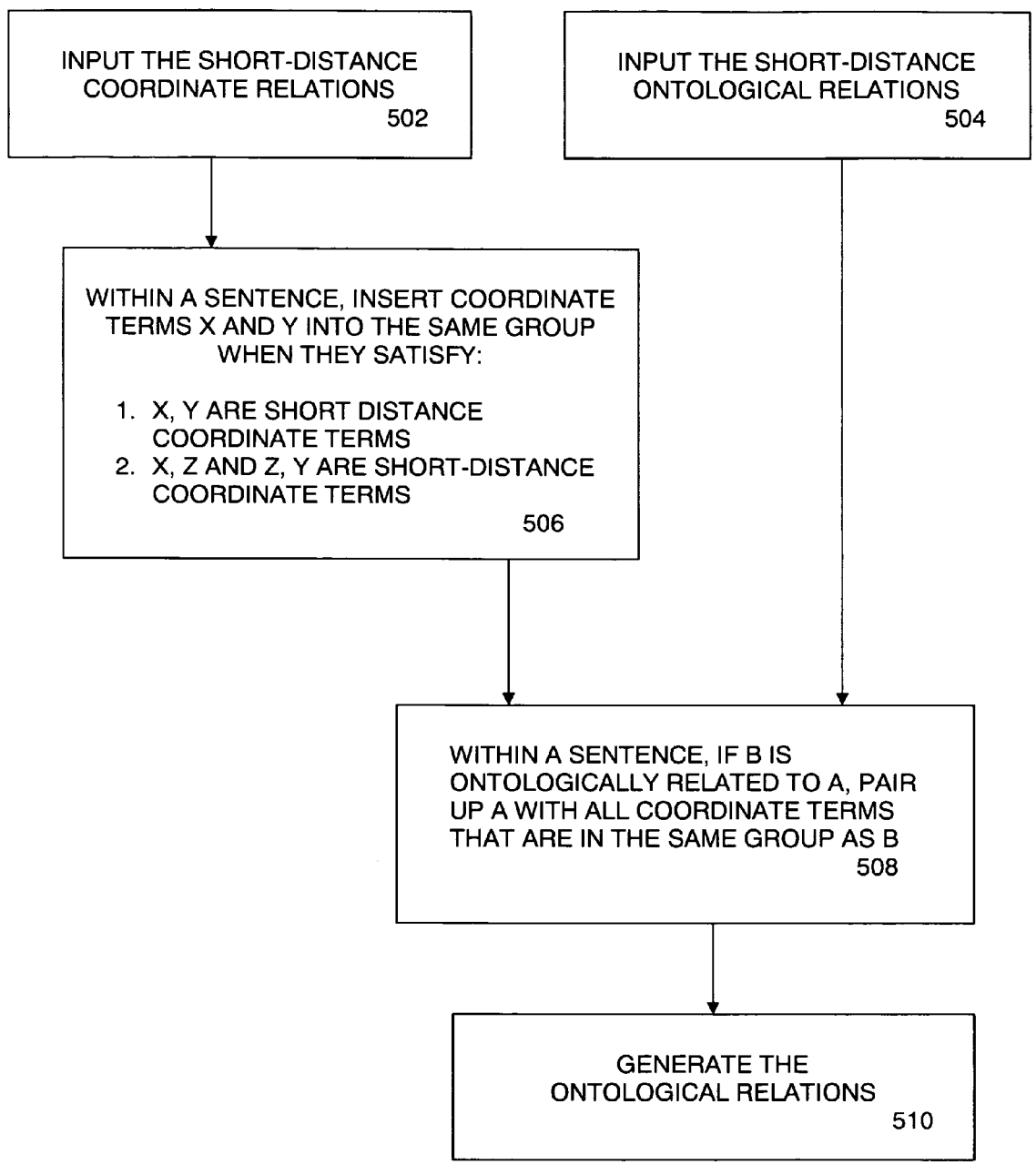
FIG. 5 is a flowchart that illustrates a method of identifying long-distance ontological relations, under an embodiment.

As shown in block 316 of FIG. 3, the long-distance ontological relations are identified using both the short-distance coordinate terms and the short-distance ontological relations. FIG. 5 is a flowchart that illustrates a method of identifying long-distance ontological relations, under an embodiment. This processing block takes as inputs both the short distance coordinate relations 502 and the short-distance ontological relations 504. For the short-distance coordinate relations, the process executes block 506 in which, within each sentence, coordinate terms X and Y are inserted into the same group when they are short distance coordinate terms and X, Z and Z, Y are short term coordinate terms. The coordinate term group for X and Y from block 506 and the short-distance ontological relations from block 504 are input into block 508 in which, within a sentence, if B is ontologically related to A, A is paired up with all coordinate terms that are in the same group as B. For example, if B, X, Y, and Z are coordinate terms, then (A, X), (A, Y), and (A, Z) are classified as the same ontological relation as (A, B). In block 510, the ontological relations are then generated.

As an example of the process illustrated in FIG. 5, suppose the input sentence is "X includes A, B, C and D". The input of block 502 contains two lists, coordinate relations and ontological (part-whole) relations. Suppose the short-distance coordinate relations are (A, B), (B, C) and (C, D). The coordinate term group is (A, B, C, D), which means A, B, C and D are under the same level. Suppose the short-distance ontological (part-whole) relation is (X, A) which means A is part of X. From this can be inferred the other three long-distance part-whole relations, (X, B), (X, C) and (X, D). In this case, the ontological relation generation block 510 outputs the following part-whole relations: (X, A), (X, B), (X, C) and (X, D).

Embodiments of the described method learn ontological relations (e.g., hypernym and part-whole relations) from manual data using lexico-syntactic patterns. These embodiments for use in a natural language processing system, as described herein can be used in various different applications, industries or industry segments, such as computing devices, industrial equipment, automobiles, airplanes, hand-held devices, cell-phones, and the like. One embodiment of such a system may be a dialog system that can be speech-based with user input and system output provided as spoken language, or it can be text-based with alphanumeric text input and output through a computing device or similar interface device.

The described methods can be used in a particular learning method, such as the maximum entropy framework, or they can be used in other learning methods. Aspects of the ontology learning method described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the ontology learning method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ontology learning method is not intended to be exhaustive or to limit the embodiments to the precise form or instructions disclosed. While specific embodiments of, and examples for, processes in dialog systems or other human-machine interaction systems, or machine learning systems are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the ontology learning method in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the ontology learning method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A computer-implemented method of learning ontological relations in a document stored in a computer memory, the method executed in a processor-based platform and comprising:

extracting terms from noun-phrases in the document, wherein the terms are included in word sequences comprising the noun-phrases;

generating short-distance patterns for both coordinate terms and ontological relations in the document, wherein short-distance patterns comprise terms separated by at most one additional term, and the coordinate terms comprise terms that share the same hypernym/ holonym parent;

generalizing the short-distance patterns for both the coordinate terms and the ontological relations;

identifying short-distance coordinate relations and ontological relations by grouping the short-distance patterns by verbs or prepositions, extracting the longest common substring within each group of pattern strings, and deriving generalized patterns for every verb or preposition; respectively from the generalized short-distance coordinate terms and short-distance ontological relations; and deriving long-distance ontological relations from the identified short-distance coordinate relations and ontological relations, wherein the long-distance ontological relations comprise ontological relations between terms separated by at least two additional terms.

2. The method of claim 1, wherein the document comprises a plurality of terms characterized by syntactic relationships among the terms.

3. The method of claim 1, wherein at least one ontological relation of the ontological relations is selected from the group consisting of: hypernym, part-whole, synonym, antonym, coordinate, entailment, troponym, and causal relations.

4. The method of claim 1, wherein identifying short-distance coordinate terms comprises performing statistical classification on the coordinate terms.

5. The method of claim 1, wherein identifying short-distance ontological relations comprises performing statistical classification on the ontological relations.

6. The method of claim 1, wherein the long-distance ontological relations are used in a natural language processing system to build a knowledge base for use with a natural language processing system.

7. An apparatus, comprising:

an input stage for inputting noun phrase portions of sentences in the document;

a database functionally coupled to the input stage and configured to store a knowledge base including words from the document; and an ontological learning component coupled to the input stage, and including a first processor identifying relations by extracting terms from the noun phrase portions to distinguish relation terms from non-relation terms, a second processor identifying coordinate relations for every pair of adjacent terms, a third processor identifying short-distance ontological relations for other adjacent terms based on term features and lexico-syntactic patterns, and inferring long-distance ontological relations based on the identified coordinate relations and the short-distance relations, wherein short-distance ontological relations comprise ontological relations between adjacent terms separated by at most one intermediate term, and the long-distance ontological relations comprise ontological relations between terms separated by at least two additional terms, and further wherein the coordinate terms comprise terms that share the same hypernym/holonym parent, the third processor further generalizing the short-distance pattern for both the coordinate terms and the ontological relations by grouping the short-distance patterns by verbs or prepositions, extracting the longest common substring within each group of pattern strings, and deriving generalized patterns for every verb or preposition.

8. The apparatus of claim 7, wherein at least one ontological relation of the ontological relations is selected from the group consisting of hypernym, part-whole, synonym, antonym, coordinate, entailment, troponym, and casual relations.

9. The apparatus of claim 7, wherein the long-distance ontological relations comprise ontological relations between terms separated by at least two terms.

10. The apparatus of claim 7, further comprising a natural language processing system functionally coupled to the database and utilizing words stored in the knowledge base.

11. The apparatus of claim 10, wherein the natural language processing system comprises a dialog system.

12. The apparatus of claim 10, wherein the natural language processing system is selected from the group consisting of a reasoning system, a question and answer system, an information retrieval system, a machine translation system, and a semantic inference system.

13. The method of claim 1 wherein the terms from the noun-phrases in the document are extracted using Conditional Maximum Entropy modeling.

* * * * *